Patented June 24, 1930

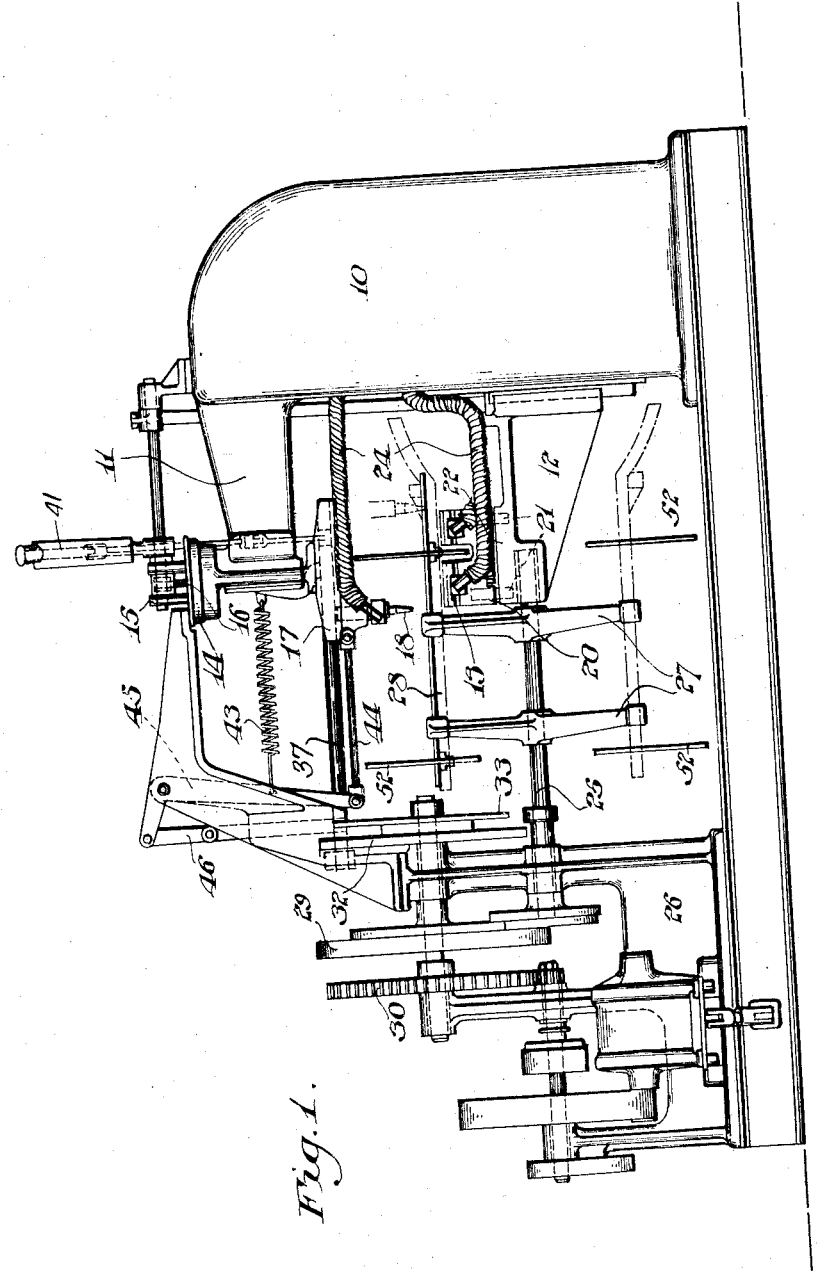

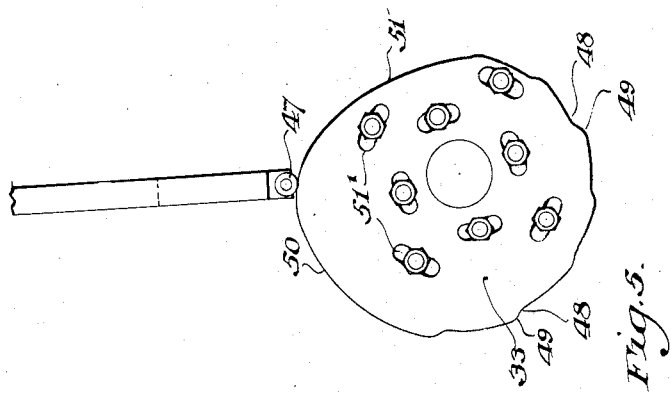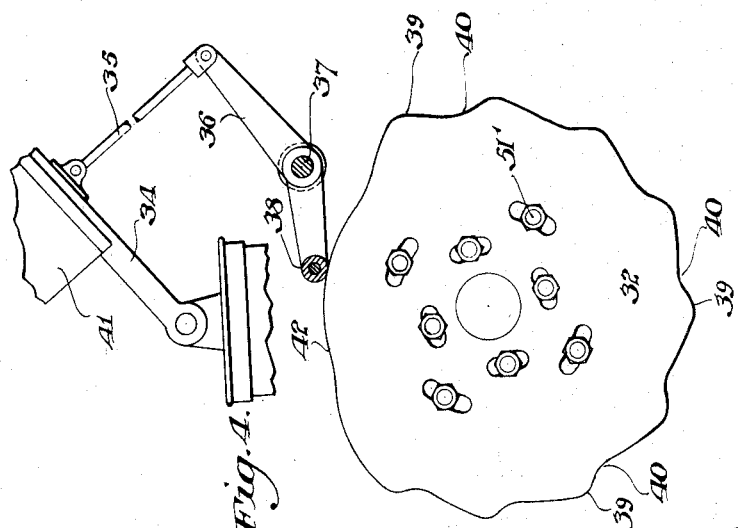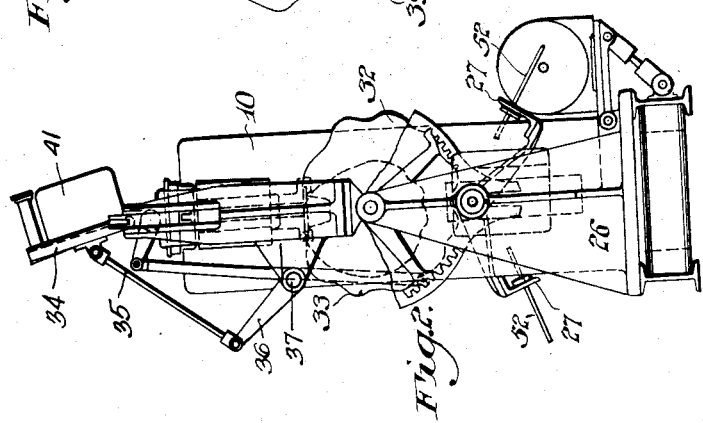

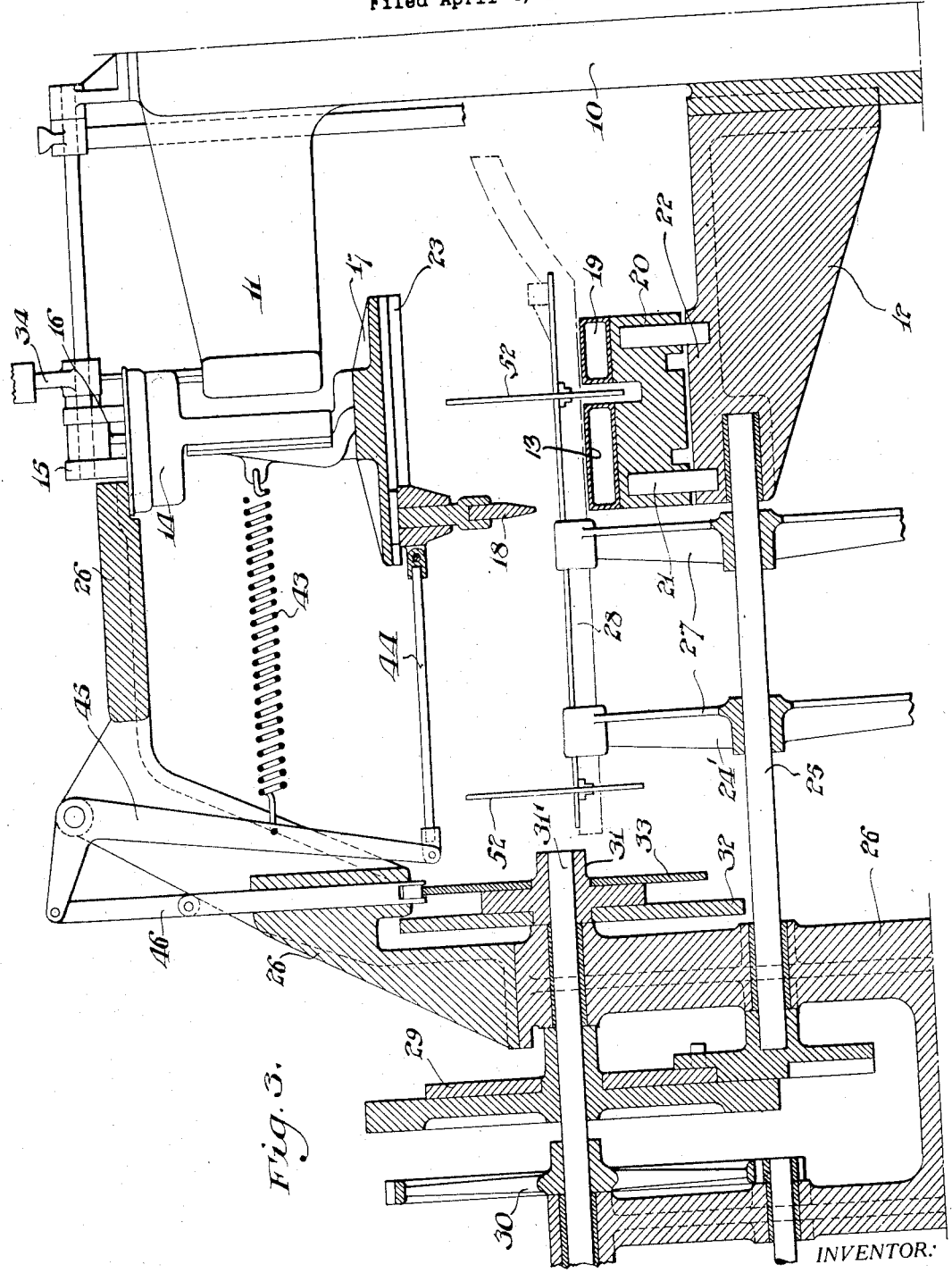

1,767,521

UNITED STATES PATENT OFFICE

CAROLUS L. EKSERGIAN, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA

AUTOMATIC SPOT-WELDING MACHINE

Application filed April 4, 1928. Serial No. 267,149.

The automatic spot welding machine of my invention is fully automatic, requiring only that work be fed to it. In other words except that in this embodiment the work is manually fed, there are no other manual operations, the work being removed after completion automatically. Correspondingly it may be said that the outstanding object of my invention has been to render the operations of such a machine fully automatic.

Ancillary objects have been to cut down the amount of labor in operating such machines. Two and sometimes three men are required to operate spot welding machines, depending on the nature of the work. My invention operates with one man. Skilled labor too, is required of the usual non-automatic machine. Since my machine requires but a man to load it, unskilled labor may be employed, still further saving in operation.

Another such object is the attainment of more reliable and more uniform welds. The exact regulation of pressure and of current and of timing, with accurate relative adjustment and operation of electrodes and work supports, are coordinated with each other and with other elements of construction in operation to bring about this result.

The machine which I employ in the practice of my invention is in large part a welding machine of standard form and construction. Combined with this machine is the work support and feed, electrode actuator, and the synchronized and otherwise coordinated mechanism which relatively operate the work and the electrodes. These latter mechanisms consist of a rotatable multiple piece work support, step by step means for rotating the support, electrodes having a step by step movement of progression from one welding position to another, means for effecting the step by step movement, and the various synchronizing elements between the work support, the step by step movement, and the electrode operation. This portion of the machine is very simply combined with the standard welding machine portion and all is arranged in one general main plane, the plane of the standard welding machine portion at large, in such manner that simplicity of construction and low cost result. Of the drawings, Fig. 1 is a general side elevation of the machine.

Fig. 2 is a general end elevation from the end opposite the standard welding machine portion.

Fig. 3 is a vertical side elevation for the most part in central section.

Fig. 4 is a diagrammatic elevation of a cam controlling the welding operations.

Fig. 5 is a similar view of the cam controlling the step by step motion of the machine.

Referring now to these drawings, the standard welding machine comprises a main substantially vertical pedestal 10 having at its upper end a horizontally extending overhanging arm 11. Below this arm 11 is a horizontally extending but vertically adjustable arm 12 which carries the fixed electrode 13 of the machine. The upper arm 11 carries the head 14 of the electrode actuating mechanism 15 through which is derived the relative movement of approach and separation of the electrodes. A vertically reciprocable column 16 extends through head 14 and carries at its lower end a cross head 17 which supports the upper electrode 18. Except for the electrodes, this construction is in general that of the standard machine. Electrodes in the standard machine, however, are ordinarily but vertically extending copper rods.

According to my invention I form the fixed electrode 13 in the form of an elongated hollow bar, in the hollow 19 of which I circulate cooling fluid. I support this elongated electrode from the arm 12 by means of a supporting bed 20 having the aligned pin connection 21 with the upper face 22 of arm 12. The upper electrode 18, which has a substantially vertical movement of approach to and separation from the elongated fixed electrode 13, I support slidably in depending relation to cross head 17 in jibs 23. Both electrodes have flexible connections 24 with the transformer which in the standard welding machine is usually housed within the main pedestal 10. Because the upper connection 24 is flexible, and because electrode 18 is supported in jibs 23, it may be adjusted longitudinally of electrode 13 to coact with any portion thereof.

The work is supported for movement into position to be operated upon by the electrodes 18 and 13 by means of the multiple piece work support 24'. This comprises a shaft 25, one end of which is journaled in the outer end of arm 12, the other end of which is projected outwardly in the plane of arm 12, and journaled in the outer framework 26 of the machine.

This shaft 25 bears one or more work support spiders or racks 27, each having several arms arranged in axial alignment. The arms at their outer ends are shaped to receive and support the work 28. In this instance the work comprises the rails of metal doors for automobiles. They are supported substantially parallel to the axis 25 and the axis 25 in turn is substantially parallel to electrode 13 and to the path of movement, inwardly or outwardly of the machine, of the upper electrode 18. The part of the work to be welded, as it is supported from the outer ends of the arms 27, overlies the fixed electrode 13 throughout the length of it which is to be welded. Ordinarily, each rail 28 carries clamped thereto another part (not shown), usually a window guide channel to be welded thereto. When moved to position overlying electrode 13, the outer side of the rail 28 contacts with the upper side of the electrode 13, and the part to be welded thereto lies on top of the rail in position to be engaged by the electrode 18.

The multiple piece work support 24' is driven in a step by step motion through the angle between the successive arms 27 by means of the Geneva gear 29. The dwell of the gear holds the work 28 in contiguity to the electrode 13. A motor (not shown) supplies power for the Geneva gear 29 through the reduction gears 30.

The coordinating mechanism 31 of the multiple piece work support, the electrodes and the electrode actuating mechanism is also driven from the gear 30. The shaft 31' of this gear is extended inwardly of the frame 26 and there provided with two cams 32 and 33. The cam 32 controls the electrode actuating mechanism 15. This cam is shown in elevation in Fig. 4. It operates the actuating lever 34 connected with the actuating column 16 of head 15 through the intermediary of a link 35, a lever 36 pivoted on a longitudinally extending shaft 37 carried between arm 11 and frame 26, and a follower 38 which bears on the periphery of cam 32. Cam 32 has its periphery serrated in form in a considerable portion, the serrations being similar and comprising alternate projections 39 and depressions 40 of similar form and extent. Therefore, the actuating lever 34 of the welding machine is moved up and down a number of times, depending upon the number of spots it is desired to weld, each time moving the electrode 18 into contact with the work at the required pressure and with the required accompanying application of current as effected through switch 41 associated with the arm 34 in the usual manner known to standard practice. Intermediate the terminii of the serrations 39, 40, the cam 32 is provided with an extended depression 42 in which the follower 38 dwells without actuating movement, and the electrode 18 is retained in position raised from the work.

The cam 33 on the other hand, is arranged to effect a step by step movement of the electrode 18 from one spot to another in the series to be welded against the pressure of tension spring 43. This is accomplished through the intermediary of the connecting link 44 to the electrode about lever 45 pivoted in the upper portion of the frame 26 and the connecting rod and pitman 46 to the follower 47, bearing on the periphery of cam 33. This cam, instead of being provided with a uniform series of serrations 39, 40 is provided with a non-uniform series 48, 49, each one of which, clockwise of the cam as shown in Fig. 5, is of increasing radial distance from the center of the cam. These extend over the major portion of the periphery of the cam. Intermediate the terminii of the serrations 48, 49, however, from that of greatest radius, the cam is provided with a dwell portion 50 of substantially uniform radius, and a return portion 51 of radius decreased from the maximum action to the minimum. Therefore, for each serration 48, 49 electrode 18 is stepped outwardly against the pressure of spring 43 a distance corresponding to that between successive spots to be welded whether that distance be uniform or not, and when the last step has been made, electrode 18 dwells in location at that spot until the spot has been welded through the action produced by the last serration 40 of the cam 32, until the follower 38 of that cam reaches its dwell portion 42, thereby raising and dwelling electrode 18 vertically removed from the work, whereupon follower 47 leaves its dwell portion 50 and passing rapidly over the return portion 51, permits spring 43 to draw the electrode 18 quickly back toward the right, to the spot from which it again start work. This general relation of cams 32 and 33 in angular arrangement and form and number of serrations is substantially as shown in Figs. 4 and 5, the angular serrations which the cams occupy in these views being those which they occupy upon the shaft 31.

Such a cycle of approach and separation of electrodes 13 and 18 and synchronized step by step movement of electrode 18 with respect to the work 28 and with respect to the electrode 13, is always carried out during a dwell of the multiple piece work support 24' as imposed by the Geneva gear 29. The Geneva gear 29 just after the electrode 18 has been freed from the last spot of a given piece of work 28, carries the multiple piece work support 24' through the angle between one piece of work 28 and the next succeeding, thereby positioning the next succeeding piece to be operated upon immediately prior to the time follower 38 reaches the first electrode actuating serrations 39, 40. At this juncture, the next dwell is imposed by Geneva gear 29. The timing of the elements in this cycle may be varied as desired. The cams 32 and 33 have an annularly adjustable connection 51' with the shaft 31' and with respect to each other, for this purpose. Their peripheries, of course, may be configured to suit any work conditions desired.

The work is fed to the multiple piece work support 27 by hand being placed in slots, over pins, under clamps or otherwise secured by means not shown. The work, however, is removed by engagement with a knockout device in the form of an inclined arm 52, which exerts pressure upon the work piece 28, leaving the electrode 13, and throws it free of the ends of the arms 27 from which it is supported.

All equivalent structures carrying out the operation of my invention I aim to cover in my claims.

What I claim is:

1. An automatic spot welding machine comprising relatively fixed and movable electrodes having a step by step movement relative to each other, together with synchronized means operating the electrodes and effecting their step by step movement.

2. An automatic spot welding machine comprising relatively fixed and movable electrodes having a step by step movement relative to each other, together with synchronized means operating the electrodes and effecting their step by step movement, and a multiple rack work support having its movement synchronized with the aforesaid movement.

3. An automatic spot welding machine comprising electrodes having a relative welding movement of approach and separation, and a step by step movement of progression from one welding position to another, together with a return motion to an original welding position, and means for effecting said movements in synchronism.

4. An automatic spot welding machine comprising electrodes having a relative welding movement of approach and separation, and a step by step movement of progression from one welding position to another, together with a return motion to an original welding position, means for effecting said movements in synchronism and a working supporting rack having a step by step motion actuated during the return movement of the electrodes.

5. An automatic spot welding machine comprising electrodes having a relative welding movement of approach and separation, and a step by step movement of progression from one welding position to another, together with a return motion to an original welding position during which the electrodes dwell apart, means for synchronizing said movements, and a multiple piece work supporting rack, operated during the return movement of the electrodes to shift one piece of work for another.

6. An automatic spot welding machine comprising electrodes having relative axial movement of approach and separation to effect the welding operation and step by step movement of relative linear translation, a multiple piece work support movable to bring a work piece into a fixed welding position, and synchronized mechanism for effecting the relative movements of said electrodes and work support.

7. An automatic welding machine comprising a set of coacting electrodes operating in a determinate plane to relatively approach and recede from each other, at least one of said electrodes being movable relative to the work to weld successive portions of the work while supported in welding position, a multiple piece work support arranged to be shifted to successively bring a work piece supported thereby into the welding plane, means for shifting the work support, and means for operating and moving said electrodes in synchronism with said shifting means.

In testimony whereof he hereunto affixes his signature.

CAROLUS L. EKSERGIAN.